Feb. 13, 1945.  H. E. KÄMMEL  2,369,574
LOCKING MECHANISM FOR TYPEWRITING CALCULATING MACHINES
Original Filed May 14, 1934  9 Sheets-Sheet 1

Inventor:
H. E. Kämmel
By Glascock Downing & Seebold
Attys.

Inventor:
H. E. Kämmel
By Glascock Downing & Seebold
Attys.

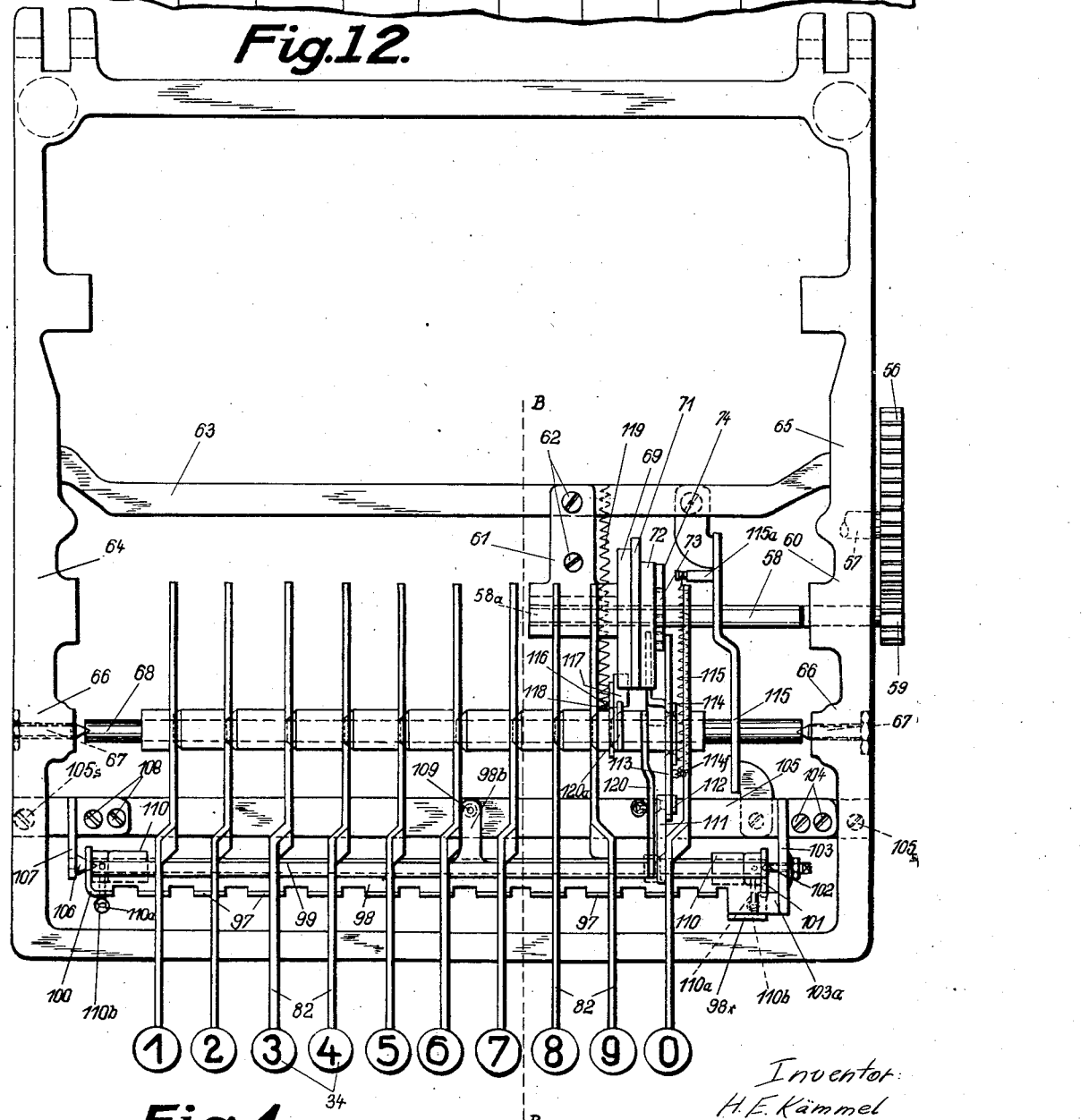

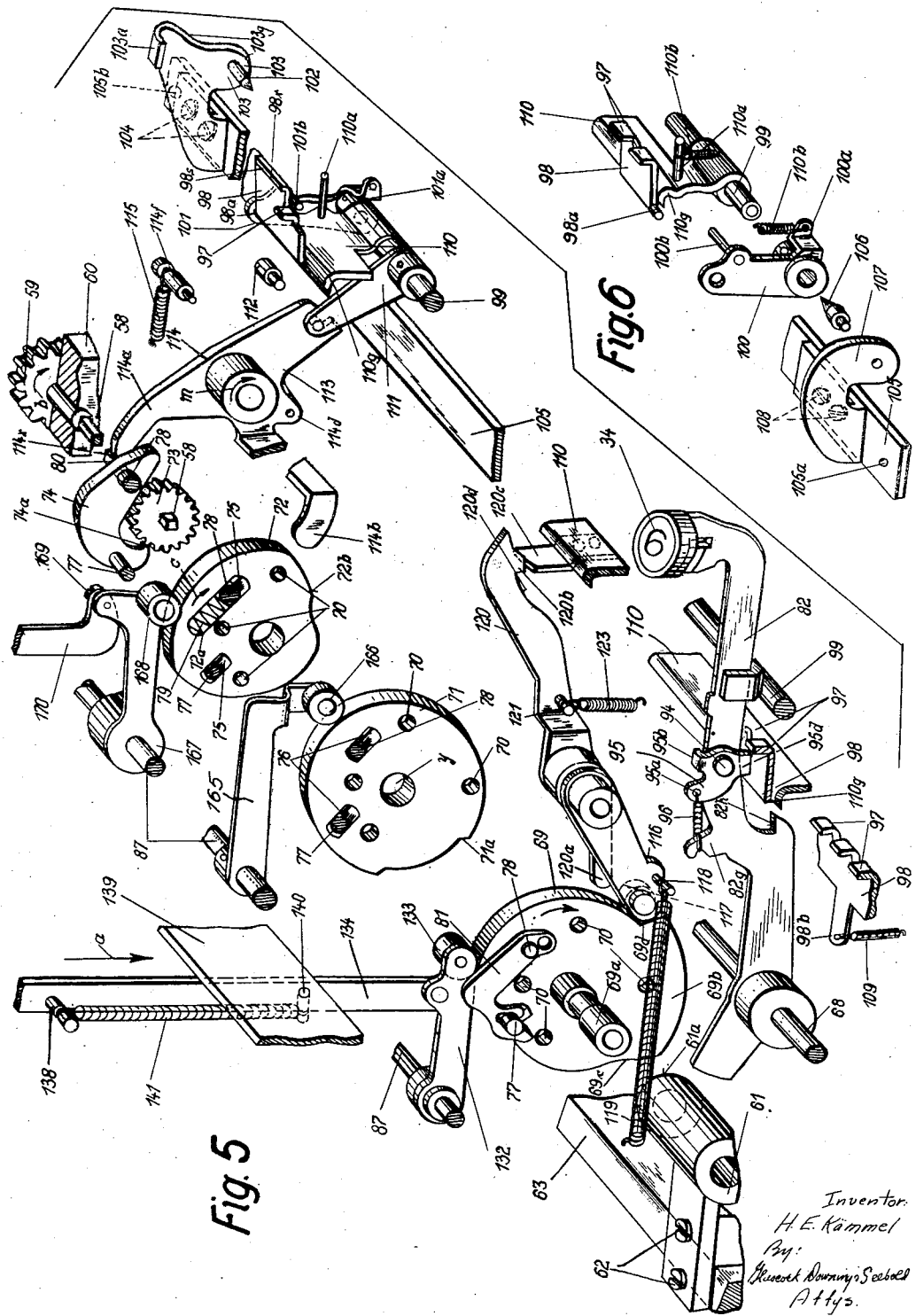

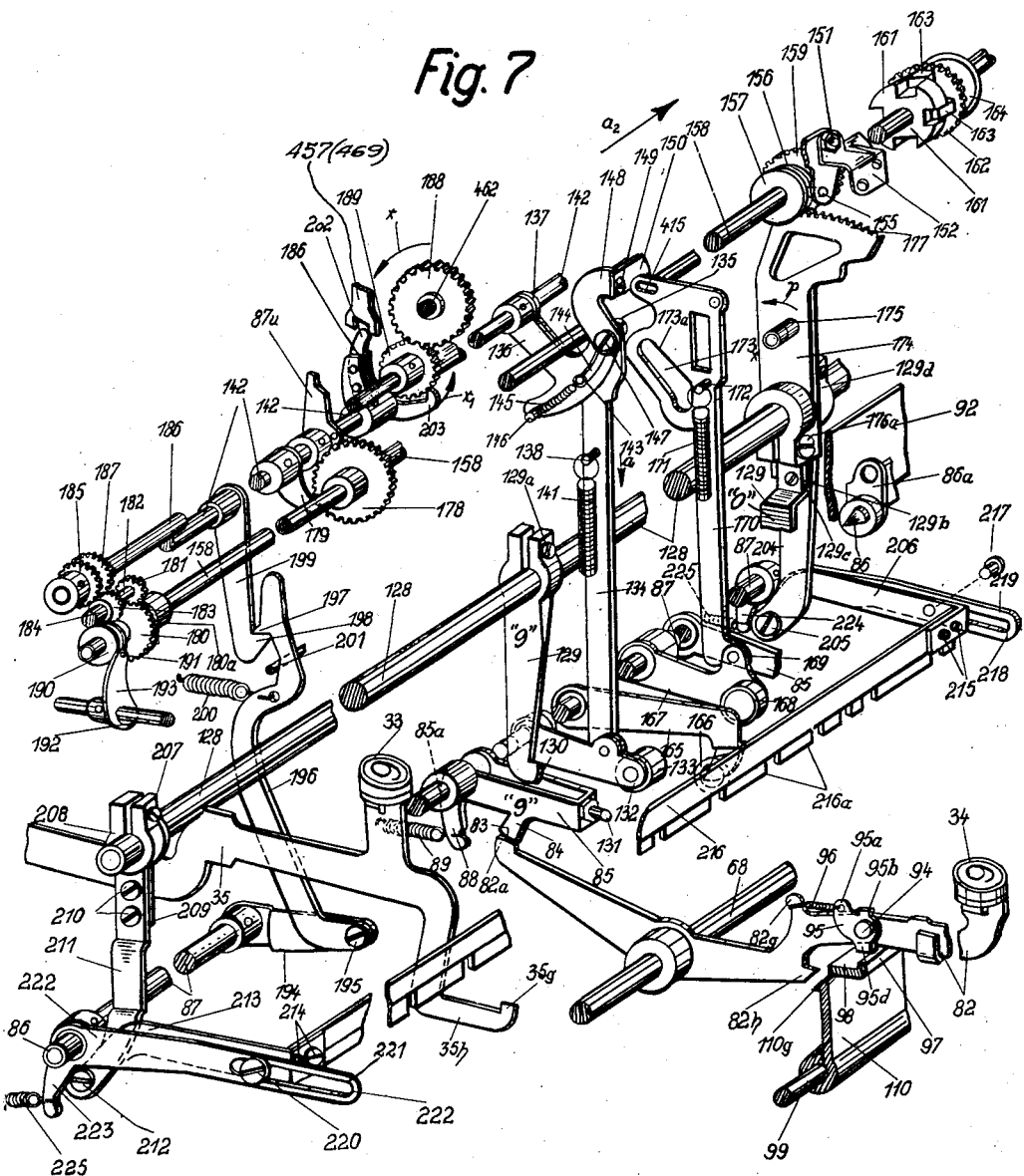

Feb. 13, 1945. H. E. KÄMMEL 2,369,574
LOCKING MECHANISM FOR TYPEWRITING CALCULATING MACHINES
Original Filed May 14, 1934  9 Sheets-Sheet 8.

Inventor:
H. E. Kämmel
By Glascock Downing & Seibold
Attys.

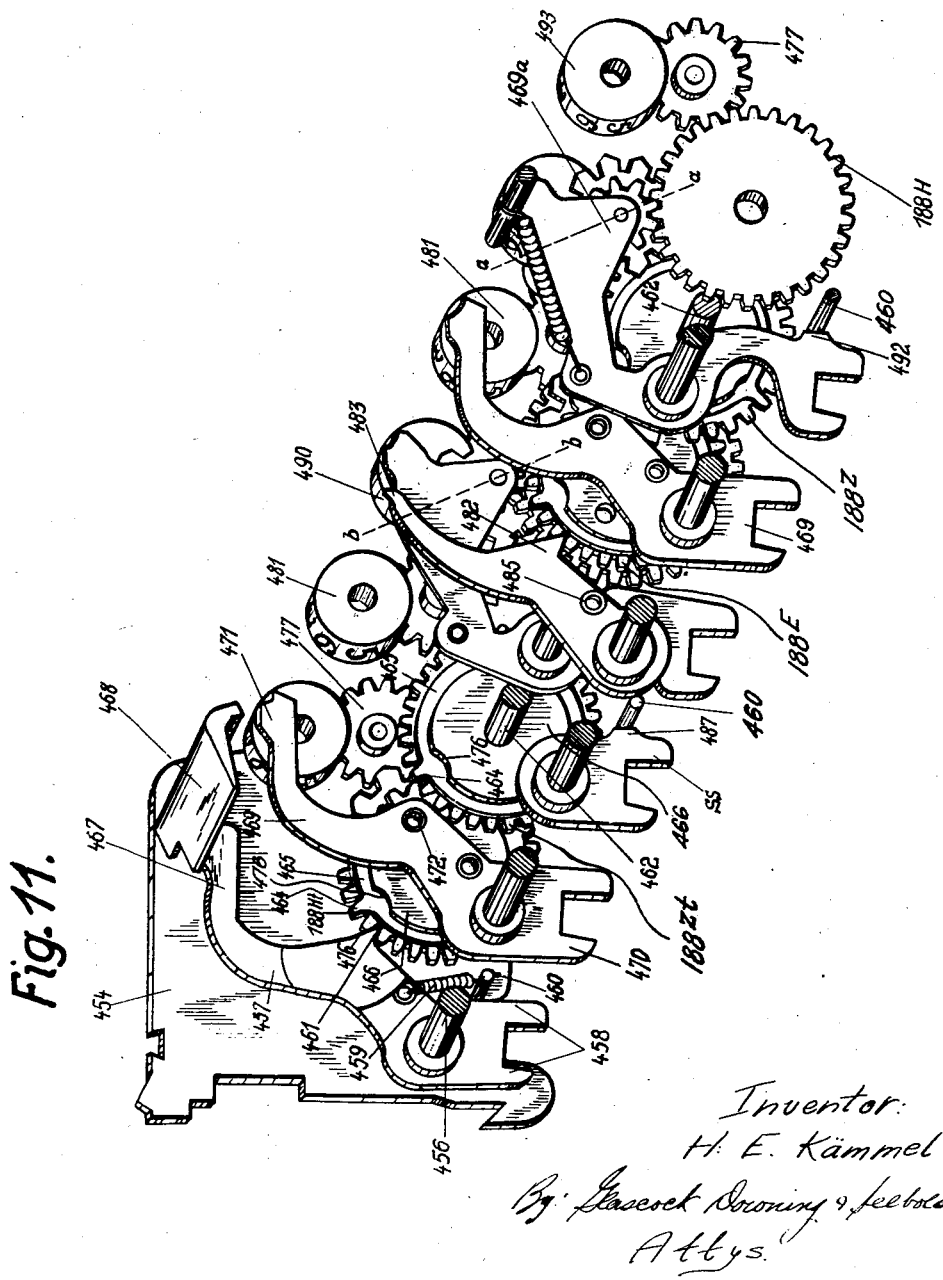

Patented Feb. 13, 1945

2,369,574

UNITED STATES PATENT OFFICE 2,369,574

LOCKING MECHANISM FOR TYPEWRITING CALCULATING MACHINES

Hugo Ernst Kämmel, Zella-Mehlis, Germany; vested in the Alien Property Custodian Original application May 14, 1934, Serial No. 725,636. Divided and this application July 31, 1939, Serial No. 287,669. In Germany May 15, 1933

3 Claims. (Cl. 235—59)

The invention relates to locking mechanisms for typewriting calculating machines exemplified in my co-pending application Ser. No. 725,636, filed May 14, 1934 (now U. S. Patent 2,236,642, issued April 1, 1941), and of which the present application is a division.

Prior locking mechanisms have had the disadvantage that their whole construction was more or less complicated, since for the withdrawal of the values, members are provided other than those for the registration of the values. For this reason former locking mechanisms were expensive in construction and their operation was unreliable.

According to the present invention, these disadvantages are now obviated by providing universal locking members which are inserted between the calculating mechanisms, respectively, and the number typing keys, respectively, and between the calculating mechanism, respectively, and the totalizer, and which control the typing and calculating operations in the registration and withdrawal of the values.

In the drawings, one example of construction of the subject of the invention is illustrated as applied to a Mercedes Addelektra typewriting calculating machine.

Figure 4 shows a plan of the drive frame together with the calculating keys and the drive coupling.

Figure 5 shows a perspective illustration viewed from the front left-hand side of the machine, of the drive coupling with the control mechanism, common to all the calculating keys, for the coupling, in which view the individual parts for the sake of better insight are represented separated from one another.

Figure 6 shows in perspective, details of the control mechanism for the coupling, the parts of which are likewise drawn out from one another.

Figure 7 shows a perspective illustration of the transmission and control mechanisms arranged between the typing and calculating keys, viewed from the front left-hand side of the machine, together with the change-over gear for the column totalizers and a part of the change over gear for the cross totalizers, in which view the individual parts are illustrated drawn out from one another.

Figure 11 shows a perspective arrangement of a totalizer viewed from the rear, in which view the detail parts are illustrated in a condition separated from one another.

Figure 12 shows a partially illustrated sheet, filled in with an example of calculation which the machine is capable of performing.

Figure 1:
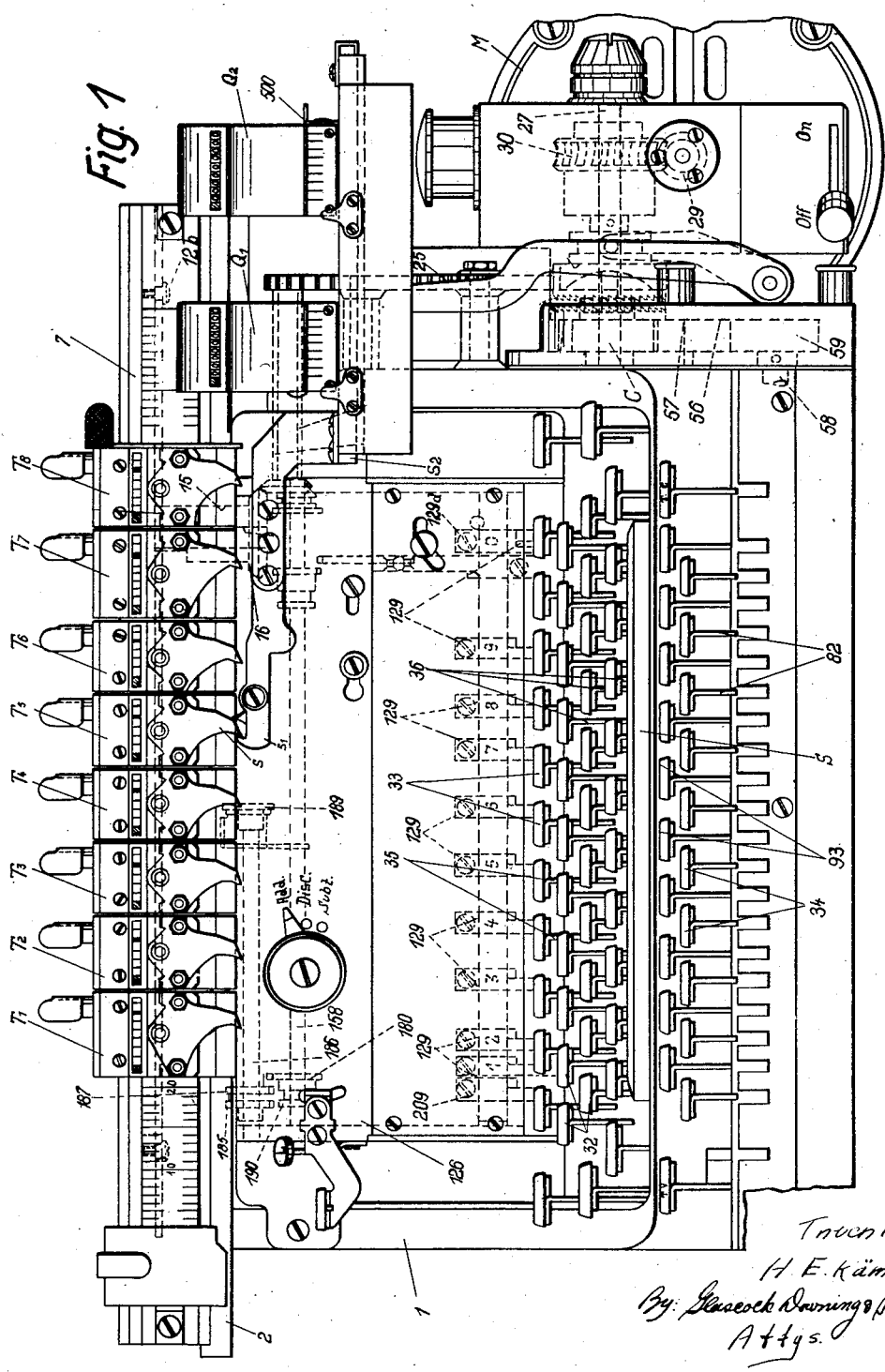
Figure 1 shows a front elevation of the whole typewriting calculating machine.

The machine housing 1 (Figures 1 and 2) carries by means of rails 2 and 3 the paper carriage 4, in which a platen 5 (Figure 2) is arranged. To the front side of the paper carriage, there is fixed a supporting rail 7, for the column totalizers T, which will be hereinafter described in detail.

A motor M arranged on the right-hand side of the machine rotates a shaft 27 clockwise (see arrow a, Fig. 2), the shaft extending across the machine frame from side to side, and being fluted, as at C, to drive the type bars, as hereinafter explained.

The typewriter mechanisms proper include letter keys 32, number keys 33 and calculating keys 34 (Figs. 1, 2 and 7) mounted upon key levers 36, 35 and 82, respectively, the letter key levers 32 being movable downwardly around pivot 37 against the action of springs 38. The calculating keys 34 act indirectly on the number key levers 35 in a manner and by means hereinafter described. By means of a pin 40, a driving pawl 41, is mounted on each key lever 35, 36, and this pawl is so acted upon by the tension spring 42, that its lug 43 rests against a nose 44, of a key lever 35, 36. The nose 45, of the driving pawl 41, engages over a nose 46, of the draw hook 49, jointed to the intermediate lever 47, by a pin 48, and the draw-hook is acted upon continually round its pin 48 in the anti-clockwise direction by a tension spring 50, and presses upwards against a stop 51, whereby its normal position is determined.

On the draw-hook 49, the control tooth 49c, provided with two teeth 49a and 49b, is rotatably mounted on the pin 49d. If one of the typing keys, 35 or 36 is depressed, the associated control tooth 49c moves into engagement with the fluted shaft C, as described in the patent to Schulze, No. 1,789,661, dated January 20, 1931. The control tooth 49c is first of all rotated slightly and then takes the draw-hook 49 along with it to the right so that the intermediate lever 47 is swung round the shaft 52, in the clockwise direction. Accordingly, the type lever 54 is swung in the anti-clockwise direction round the shaft 55, and strikes the platen 5.

The spur wheel 28 (Figures 1 and 2) which is non-rotatably mounted on the shaft 27 (Figure 1) engages with a spur wheel 56, which is rigidly mounted on the shaft 57. The spur wheel 56 again is in engagement with the spur wheel 59, rigidly mounted on the calculator drive shaft 58 (Figures 1, 2, 4 and 5).

The above described mechanisms do not belong to the invention but have been briefly described for the better understanding of the parts to be hereinafter described pertaining to the invention.

The calculating mechanism drive shaft 58 (Figures 2, 4, 5) is rotatably mounted in the bearing eye 60, arranged in the right hand side of the machine housing 1, and the opposite end 58a, of the shaft 58, is rotatably mounted in a bearing 61, which is fixed by means of the screws 62, to a bridge 63 connecting the two side walls, 64 and 65. A fulcrum rod 68 (Figures 2, 4, 5, 7 and 8) is rigidly mounted by means of set screws 67, screwed into bosses 66 (Figure 4) on the left and right hand side walls 64 and 65 of the machine housing 1, and on this shaft, members to be hereinafter described, are swingably mounted.

In the bearing eye 61 (Figures 2 and 5), a cam 69 (Figures 2, 4, 5) is rotatably mounted by means of sleeve 69a, rigidly fixed to the cam. The cam 69 is rigidly connected to the cams 71 and 72 by means of screws (not illustrated) which pass through holes 70 of the cams. The calculating drive shaft 58, however, remains without any action on the cams, since the cams 69, 71 and 72, as well as the sleeve 69a, have larger bores y (Fig. 5) than the diameter of the shaft 58. The cams 69, 71 and 72 are prevented from lateral displacement by contact of the side 69b of the cam 69 with the edge 61a of the bearing eye 61, and by contact of the cam 72 with the toothed wheel 73, non-rotatably mounted on a non-circular part of the calculating drive shaft 58. The toothed wheel 73 participates in the rotation of the calculating drive shaft 58, which when the machine is operated, continually rotates in the arrow direction b (Fig. 5). On the cam 72 a pawl 74 (Figures 4, 5) is displaceably arranged by means of pins 77 and 78, which engage in elongated slots 75 of the cam 72, in elongated slots 76 of the cam 71, and in elongated slots (not illustrated) in the cam 69. The pawl 74 is acted on continually in the direction of the arrow c (Figure 5) by a compression spring 79, which abuts against the pin 78, fixed to the pawl 74, and against the face 72a of the slot 75 in the cam 72. Moreover, a stud 80 formed on the pawl 74 co-acts with a clutch disengaging detent to be hereinafter described in detail, by means of which the tooth 74a of the pawl 74, is held out of engagement with the toothed wheel 73. In ring grooves (not illustrated) in the ends of the pins 77 and 78 of the pawl 74, which project from the left-hand side of the cam 69, a locking member 81 is fixed, in the manner illustrated in Figure 5, so that the pawl 74 always remains in connection with the cams 69, 71 and 72, and is prevented from falling out. It may be remarked at this point that for the whole ten calculating keys 34, only one coupling as just described, is necessary.

The ten calculating key levers 82 (Figures 1, 2, 4, 5, 7) which carry the calculating keys 34, are swingably mounted on the shaft 68, already mentioned. The rearwardly directed limbs of the calculating key levers 82 are somewhat upwardly bent at their ends, and have arched surfaces 82a (Figure 7) to contact the similarly convex ends of the downwardly directed projections 84 of the U-shaped stop members 85. The latter are swingably mounted on a printer shaft 87 (Figures 2, 3 and 7) which is rotatably mounted by means of two set screws 86 (Figures 3 and 7). Each of the set screws 86 is screwed into a corresponding angle member (Figure 3) the angle members being fixed by means of screws 86b to both side members 86c of the cradle housing. The stop members 85, moreover, are held in position in the axial directions by means of distance pieces 85b (Figure 3), arranged on the shaft 87.

On the left-hand limbs of the stop members 85, which correspond to the values "1" and "9," and on the right-hand limbs of the stop members 85 (Figure 3) which correspond to the values "2" to "8," projections 88 (Figures 2, 3 and 7) are arranged, with which engage springs 89, connected to pins 90 (Figure 2) riveted into angle members 91 (Figure 2) which are fastened by screws 91a to a bar 92 (Figures 2 and 7) attached to the two side walls of the machine frame in any suitable manner. By means of these springs 89 the stop pieces 85 are acted on in the clockwise direction round the shaft 87, so that they rest with their faces 85a (Figure 2) against the bar 92, whereby the normal position of these stop members 85 is determined. Since the calculating key levers 82 are acted upon by their own weight in the clockwise direction round their pivot rod 68, and consequently rest with their arched faces 82a against the arched faces 83 of the stop members, the normal position of the calculating key levers 82 is determined. A depression simultaneously of two calculating keys 34, or of a calculating key 34 and a decimal tabulator key 93 (Figure 1) is rendered impossible by the generally known roller key lock of the Mercedes-Addelektra-machine (not illustrated)

Figure 2:
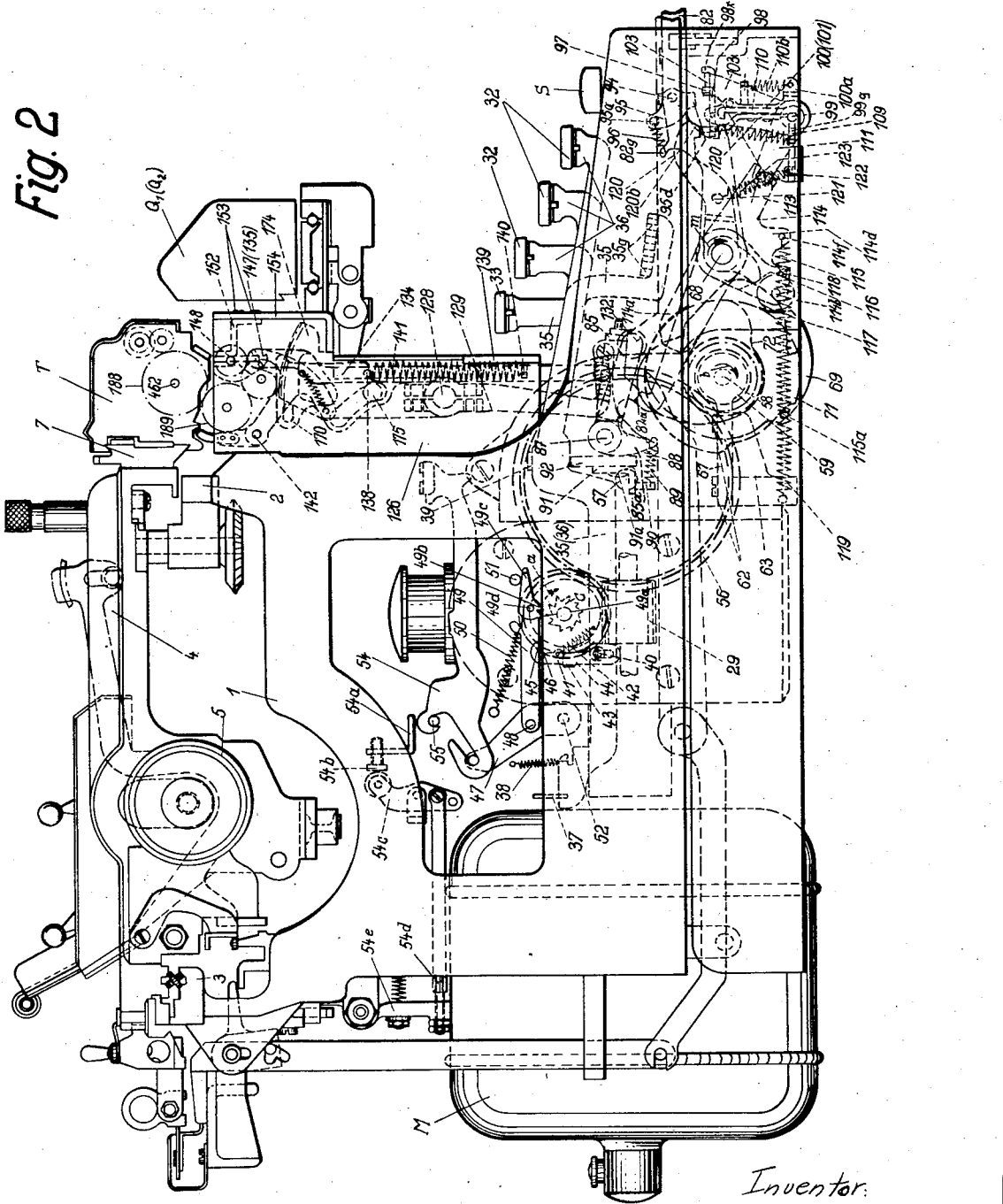
Figure 2 shows a left-hand side elevation of the machine.
Figure 3:
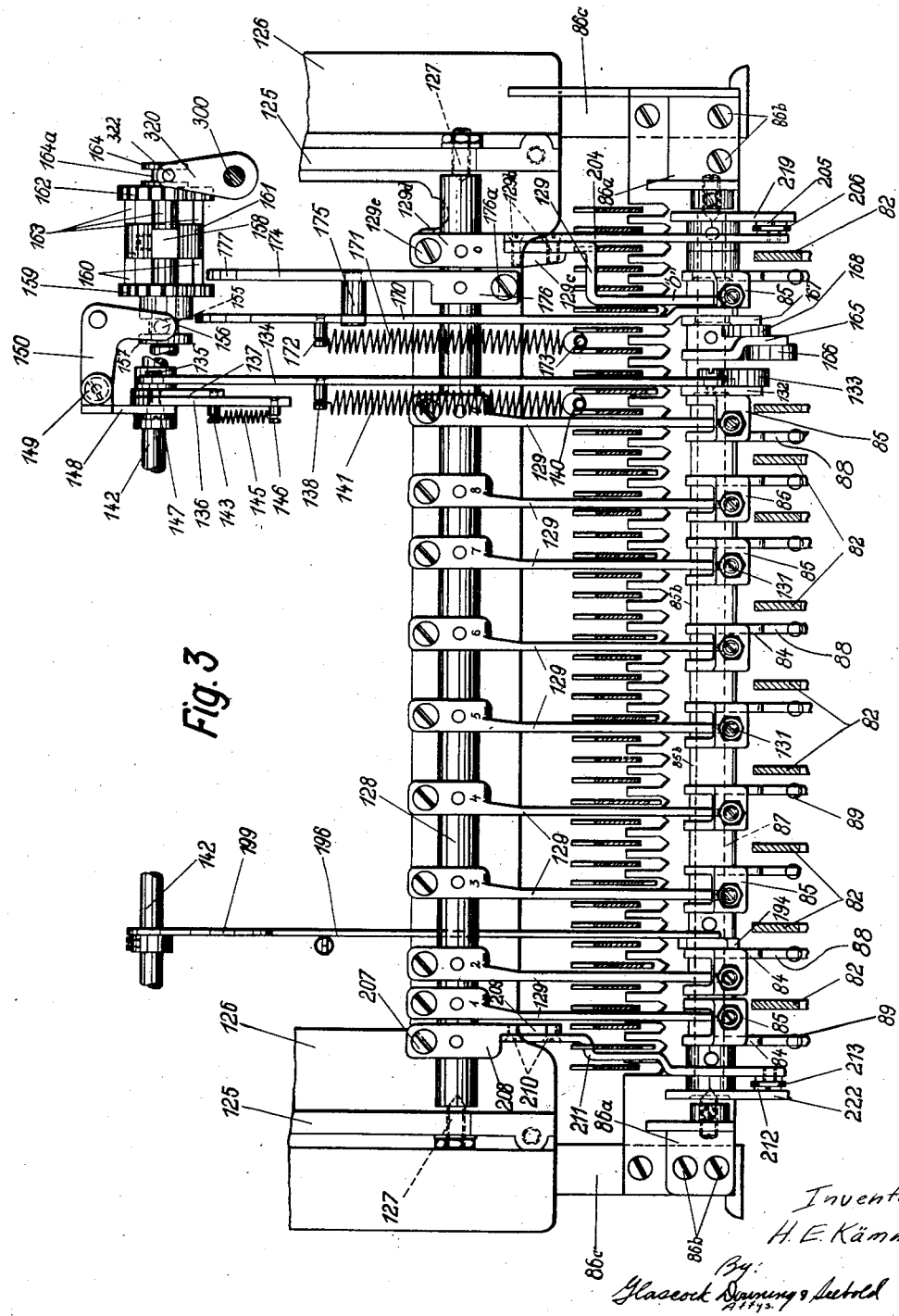
Figure 3 shows a front elevation looking towards the calculating members, together with the calculating segment and a part of the change-over gear for the cross-totalizers, in which view the number typing keys and the letter typing keys are represented in section.
Figure 8:
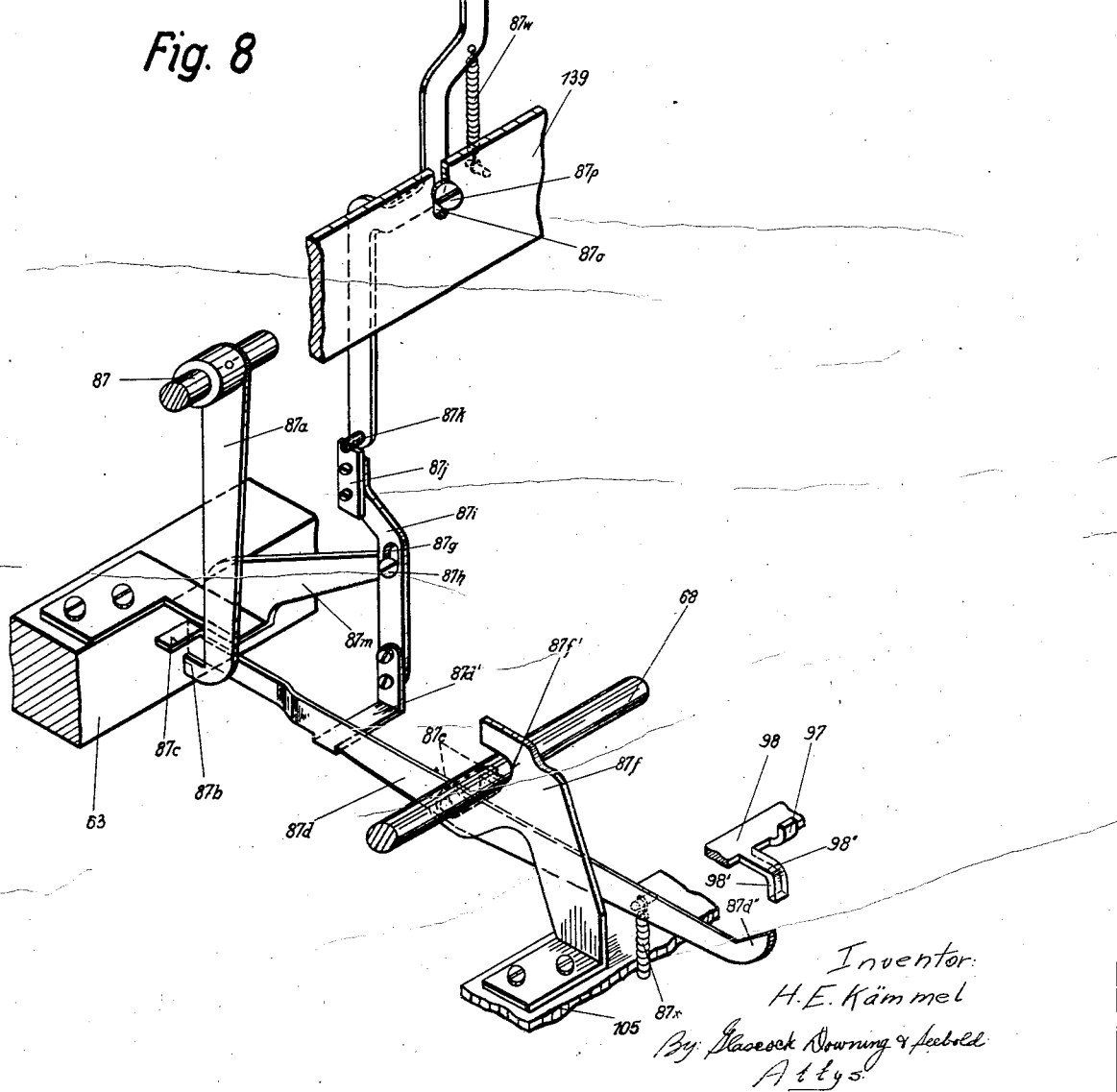
Figure 8 shows a perspective illustration of a locking mechanism controlled by the column totalizers, viewed from the front left-hand side of the machine.

On each calculating key lever 82 a pawl 95 is swingably mounted by a rivet 94 (Figures 2, 5 and 7). A spring 96, attached to the tail 95a of the pawl 95 is connected to a nose 82g on the key lever 82. By means of this spring 96, the pawl 95, is acted on in the anti-clockwise direction round its rivet 94. The normal position of the pawl 95 is determined by the contact of the right-angled bent lug 95b, on the pawl against the upper edge of the key lever 82. The downwardly directed end 95d of the pawl 95 is capable of co-acting with the right-angled upwardly-bent nose 97 of a latch bar 98. On the right and left hand ends of the latch bar 98, pins 98a (Figures 5 and 6) are formed, one pin being arranged at each end. By means of these pins, the latch bar 98 is swingably mounted on the levers 100 and 101, rigidly mounted at opposite ends of the rock shaft 99. The rock shaft 99 at its right hand side is rotatably mounted by means of a set screw 102 (Figure 5) in a bearing member 103, fixed to a cross bar 105 by screws 104.

On the left-hand side of the machine, the rock shaft 99 is rotatably mounted on a bearing 106 (Figure 6) in a bearing member 107 fixed with screws 108 to the cross bar 105 already mentioned. The cross bar 105 is fixed to both side walls 64 and 65 of the machine housing 1 by screws 105s (Figure 4) which pass through holes 105a and 105b (Figures 5 and 6) of the bar 105.

By means of a spring 109, which engages with a lug 98b of the latch bar 98, and is connected to a pin 99g (Figure 3) rigidly fixed to the rock shaft 99, the latch bar 98 is acted on in the anti-clockwise direction round its pins 98a, so that at its right-hand end its upper horizontal surface presses upwards against a bent lug 103a on the stationary bearing block 103, whereby the normal position of the latch bar 98 is determined.

A key locking bar 110 (Figures 2, 5, 6) is swingably mounted at both its ends on the rock shaft 99, in the manner indicated in Figures 5 and 6. At the right-hand and left-hand ends of the key locking bar 110, further, pins 110a are fixed, with each of which a spring 110b (in Figure 5 this has not been illustrated for the purpose of rendering other parts visible) engages, which springs are connected, respectively, to bent lugs 100a and 101a of the levers 100 and 101. By means of these springs 110b the key locking bar is always urged round the rock shaft 99 in the clockwise direction, whereby its normal position is determined by contact with the pin 100b, riveted to the lever 100 and by contact with the pin 101b riveted to the lever 101. The right-angled flange 110g of the key locking bar is capable of co-acting with the noses 82h (Figure 5) formed on the several calculating key levers 82, in a manner to be hereinafter described.

On the rock shaft 99 (Figures 2, 5, 6) further, a lever 111 is rigidly mounted to the free end of which a pin 112 is riveted (in Figure 5 for the sake of illustration the same is indicated in the withdrawn position). The pin 112 of the lever 111 co-acts with the fork-shaped end of an arm 113 of a three-armed lever 114, swingably mounted on the fulcrum rod 68. The arm 114a of the three-armed lever 114, co-acts with the stud 80, already mentioned, of the pawl 74, while the arm 114b of the same, co-acts with the cam 72, in a manner hereinafter described. A spring 115 engages with a pin 114f (in Figure 5, the pin 114f is shown removed from the lever 114 for purposes of illustration) riveted to the nose 114d (Figure 5) of the three-armed lever, the spring at its other end being connected to a pin 115a (Figure 4) on a stay 115b, fixed to the part 63 and to the cross bar 105. By means of this spring, the three-armed lever 114 is rocked clockwise round the fulcrum rod 68, in consequence of which the lever 111 connected to it, the rock shaft 99, and the levers 100 and 101 pinned to it, the key locking bar 110, and finally the latch bar 98, are urged in the anti-clockwise direction, whereby the upper face of the lug 98x, under the action of the spring 109, and its lip 98s under the action of the spring 115, contacts with the front edge 103g of the lug 103a, of the bearing member 103, whereby the normal position of the parts 114, 111, 99, 100, 101, 110 and 98, is determined.

Further, on the fulcrum rod 68 a lever 116 (Figures 2, 5) is swingably mounted, at the free end of which a roller 117 is arranged, capable of co-acting with the cam 69. By means of the spring 119 which engages with the pin 118 of the lever 116, and is connected to the cross bar 63, the roller 117 is always maintained in contact with the cam 69.

The lever 120, which similarly is swingably mounted on the fulcrum rod 68, is likewise capable of co-acting by means of its rearwardly directed arm, 120a (Figure 6) with the cam 69. By means of the spring 123, which engages with the pin 121 and is connected to a pin 122 (Figure 3) of the cross bar 105, the lever 120 is urged in the clockwise direction round the fulcrum rod 68, whereby the projection 120b of this lever contacts with an ear 120c, fixed to the key locking bar 110, and the normal position of the lever is thereby determined.

By means of the set screws 127, screwed into the two side walls 125 (Figure 3) of the calculating mechanism 126 (Figures 1, 2, 3 and 7) a differential shaft 128 is freely rotatable. To this shaft 128 depending feeler fingers 129 are adjustably secured in position, the lower free ends of which fingers are forwardly bent and are capable of co-acting by means of their slightly arched faces 130 with the stop pins 131 (as best shown in Figure 7) arranged on the stop members 85. The stop pins 131 are mounted so as to be adjustable. The right-angled forwardly-bent ends of the feeler fingers 129 are of different lengths (Fig. 2) to correspond to the values "1" to "9." The right-angled bent end, corresponding to the value "1" of the feeler finger 129, lying farthest to the left (Figure 3) is the longest, and the right-angled bent end corresponding to the value "9" of the feeler finger 129, which is located on the differential shaft 128 at the right hand side of the machine to the left of the feeler finger 129 corresponding to the value "0," is the shortest.

The feeler finger 129, corresponding to the value "0," is arranged so as to be capable of being fixed by means of screws 129b (Figures 3 and 7) to a lever 204, hereinafter described in detail, fixed to the projection 129c of a clamping member 129d. As the feeler finger 129, corresponding to the value "0" is not allowed to execute any swinging movement, because such movement would also be permitted the calculating sector 174, would be swung therewith and in this manner a wrong value would be registered in one of the column totalizer 6, the right-angled bent end of the feeler finger 129 (Figure 4) corresponding to the value "0" is still longer than the right-angled bent end of the feeler finger 129, corresponding to the value "1" so as to prevent any movement of the calculating sector 174 when the zero key is depressed.

On the printer shaft 87 (Figure 8) a printer locking lever 87a is pinned which is capable of co-acting by means of its nose 87b with the lug 87c of a machine locking lever 87d pivoted on a screw 87e mounted on a supporting bracket 87f, screwed fast to the cross bar 105. A fork-shaped part 87f', of the bracket 105 embraces the fulcrum rod 68, and thus supports the same. On the machine locking lever 87d an arm 87d' is bent in the form of a U, to the upwardly projecting free end of which, a link 87i, guided by a screw-slot connection 87g, 87h, is attached. The upper end of the link abuts a pin 87k, by means of its setting piece 87j. The screw 87h of the screw-slot connection is moreover, screwed to a support 87m fixed to the cross-bar 63 of the machine housing. The said pin 87k is riveted to the lower end of a link 87n, which is guided in the front wall 139 of the calculating mechanism by a screw-slot connection 87o, 87p. At its upper end, the link 87n is jointed to one end of a lever 87r, rotatable on the screw 87q (Figure 8), the opposite end of which lever co-acts with one end of a lever 87s, rotatably mounted on the master wheel shaft 186 (Figure 7). The feeler lever 87s is capable by means of its nose 87s' of feeling the cam bars 87t, arranged on the column totalizers T1 to T8.

The feeler lever, 87s, moreover, co-acts with a locking lever 87u, mounted on the locking shaft 142, which locking lever is connected with the sensing lever 87s by a spring 87v. If no cam bar 87t of a column totalizer lies over the nose 87s' of the feeler lever 87s, or if the nose 87s' lies in the intermediate space 87b' of two cam bars 87t, so the nose 87s'' of the feeler lever 87s lies in the path of the shoulder 87i' of the locking lever 87u under the action of the spring 87v, whereby the rest position of the feeler lever 87s is determined. If the feeler lever 87s is in the rest position, the intermediate lever 87r is swung clockwise around the screw 87q under the action of the spring 87w, which engages with the link 87n. Hereby the free end of the intermediate lever 87r lies against the nose 87s' of the feeler lever 87s whereby the rest position of the levers 87r and 87s is determined. In this case, also, the machine locking lever 87d is swung by the link 87i in the anti-clockwise direction against the action of the spring 87x which engages the machine locking lever 87d, and is weaker than the spring 87w, whereby the lug 87c at the rear end of the lever 87d, moves in front of the nose 87b of the printer locking lever 87a and prevents the latter from swinging in the clockwise direction. Similarly, the nose 87d'' of the machine locking lever 87d moves behind the edge 98' of the hook 98'' of the latch bar 98, whereby a swinging of the latch bar 98 in the anti-clockwise direction is prevented.

A roller lever 132 is loosely rotatable on the printer shaft 87 (Figures 5 and 7) and on the free forwardly-directed end of this lever a roller 133 is mounted capable of co-acting with the cam 69, hereinbefore described. To the roller lever 132 is jointed a draw-bar 134 which, at its upwardly directed free end, is jointed by a screw 135 (Figures 2, 3 and 7) to the lever 137, loosely rotatable on the locking shaft 142. By means of a spring 141, which engages with the pin 138, rigidly mounted on the draw-bar and is connected to a pin 140, rigidly mounted on the front wall 139 (Figures 2 and 5) of the calculating mechanism 126, the draw-bar 134 is urged always in the direction of the arrow a (Figures 5 and 7), so that the roller 133 is always maintained in contact with the cam 69.

The locking shaft 142 is loosely rotatable on set screws (not illustrated) on the two side walls 125 of the calculating mechanism 126. To the lever 137 a pin 143 is fixed, which projects through an elongated hole 144 of a lever 136, rigidly mounted on the locking shaft 142. A spring 145 engages with the pin 143 of the lever 137, the other end of the spring being connected to a pin 146, fixed to the lever 136, whereby both levers 136 and 137 are yieldingly connected to one another.

To the lever 136, one end of a connecting member 148 is jointed by a screw 147, the opposite end being jointed to one arm of an angle lever 150 (Figures 3, 7) by a screw 149. The lever 150, again, is swingably mounted by a screw 151 on a bracket 152, fixed by screws 153 (Figure 3) to the front wall 154. To the angle lever 150 (Figure 7) is fixed a pin 155, which projects into a ring groove 156 of a sleeve 157, arranged so as to be axially displaceable on a transmission shaft 158, mounted in any suitable manner in the two side walls 125 of the calculating mechanism 126. With the sleeve 157 a gear wheel 159, likewise mounted so as to be axially displaceable on the shaft 158, is in fixed connection. Pins 160 (Figure 3) are arranged on the toothed wheel 159, and these pins are always in engagement with a claw 161 (Figures 3 and 7) rigidly mounted on the transmission shaft 158. Further, on the transmission shaft 158 is arranged a toothed wheel 162, the pins 163 of which are likewise in engagement with the claw 161 (Figures 3 and 7). The toothed wheel 162 is rigidly connected to a ring grooved sleeve 164 (Figure 3) arranged so as to be axially displaceable on the transmission shaft 158.

On the printer shaft 87 (Figures 3, 5 and 7) there is rigidly mounted a printer lever 165, on the free downwardly projecting end (Figure 5) of which a roller 166 is arranged, and this roller is capable of co-acting with the cam 71, hereinbefore described. The printer lever 165 is, moreover, fixed on the printer shaft 87 in such a manner that its roller 166 is normally in contact with the cam 71.

Besides, on the shaft 87 (Figures 3, 5, 7) a lever 167 is arranged, so as to be loosely rotatable thereon. To the lever 167 a roller 168 is attached, so as to be rotatable, and this roller is capable of co-acting with the cam 72, hereinbefore described, in a manner to be hereinafter described in detail. To the lever 167 a slide 170 is jointed by means of a headed screw 169. By means of a spring 171 connected to a pin 172, arranged on the slide 170 and to a pin 173 (Figure 3) arranged on the front side of the calculating mechanism, the slide 170 is always acted upon downwards in the arrow direction a, whereby the roller 168 of the lever 167 is always held in contact with the cam 72. The slide 170 is provided with an elongated hole 173 formed correspondingly to that in Figure 7 into which hole projects a roller 175 mounted on the calculating sector 174. The calculating sector 174 is arranged so as to be capable of adjustment and of being fixed in position on the differential shaft 128 by a screw 176a. The upwardly directed part of the calculating sector 174 is provided with teeth 177, with which the main driving gear wheel 159, hereinbefore described, is capable of being moved into engagement. The toothed sector 174 (Figures 2, 3, 7) which is actuated on striking a calculating key 34, in a manner to be hereinafter described, transmits the swinging movement corresponding to the value of the struck key, by way of the toothed wheel 159, and transmission shaft 158, to a locking wheel 178 (Figure 7) rigidly mounted on the shaft 158, which locking wheel is always in engagement with a guide and locking tooth 179. Further, on the transmission shaft 158 a toothed wheel 180 is mounted so as to be capable of axial displacement. Wheel 180 is normally in engagement with a toothed wheel 181, integrally formed with a hollow shaft 182, and a toothed wheel 183. The unit 181, 182 and 183 is rotatably mounted on a shaft 184, fixed in the left-hand wall 125 (Figure 3) of the calculating mechanism. The toothed wheel 183, again, is in engagement with a toothed wheel 185, rigidly mounted on a master wheel shaft 186 rotatably mounted in the left-hand side wall 125 of the calculating mechanism and in a bearing member (not illustrated) arranged approximately at the centre of the machine.

Beside the toothed wheel 185, there is a further toothed wheel 187, mounted so as to be non-rotatable on the shaft 186. Further, on the master wheel shaft 186 a master wheel 189 (Figure 7) is rigidly mounted, with which the toothed wheels 188 (Figure 2) of the column totalizers T engage in the working position.

On the wheel 180, a ring grooved sleeve 190 is rigidly mounted, into which groove projects a pin 191 of a lever 193, rigidly mounted on the state control shaft 192, rotatably mounted in the calculating mechanism. The driving of the toothed wheel 180 (Figure 7) on a rotational movement of the transmission shaft 158, is effected by a coupling disc 180a, pinned to the transmission shaft 158, and engaged by claws 180b, rigidly connected with the toothed wheel 180.

On the printer shaft 87 (Figures 2 and 7) there is rigidly mounted a lever 194, to the free upwardly directed end of which a draw-bar 196 is jointed by the screw 195. A nose 197 of the draw-bar 196 engages over a nose 198 of a lever 199 rigidly mounted on the locking shaft 142. By means of a spring 200 which engages with the draw-bar 196, and which is connected in the calculating mechanism in any suitable manner, the lever 196 is normally swung about the screw 195 in the anti-clockwise direction, whereby the lever 196 is normally positioned so that its nose 197 always remains in engagement with the nose 198 of the lever 199. The lever 196 rests against a pin 201, arranged in any suitable manner in the calculating mechanism.

On the locking shaft 142 (Figures 2, 7) there is fixed a release finger 202 capable of acting on a locking lever 457 and on similar levers 469, all of which are arranged in the totalizers T1 to T8 in a manner to be hereinafter described. Further, on the locking shaft 142 there is a locking tooth 203 rigidly mounted, capable of co-acting with the master wheel 189, rigidly mounted on the master wheel shaft 186.

On the clamp 129d (Figures 3 and 7), as already hereinbefore described, a member 204 is also mounted by screws 129b, and to the lower end of the member 204, which is somewhat bent at the rear, a bail arm 206 is jointed by a screw 205. On the left-hand side of the machine a clamp 208 is arranged so as to be capable of adjustment and to be clamped in position by a screw 207. To the projection, 209 of the clamp 208 a member 211, correspondingly formed to that in Figure 7 is fixed by screws 210, and to the free downwardly projecting end of the member 211 there is attached a bail arm 213 by a screw 212. A bar 216, correspondingly formed to that in Figure 7, is fixed to the bail arm 213, and 206 by screws 214 and 215, respectively, so that a frame consisting of the parts 208, 211, 213, 216, 206, 204 and 129d is formed.

The bail arm 206 (Figure 7) located on the right-hand side of the machine, moreover, is guided by a headed screw 217, which projects through an elongated slot 218 of a lever 219, rigidly mounted on the printer shaft 87 and the bail arm 213, arranged on the left-hand side of the machine, is guided by a headed screw 220, which projects through the elongated slot 221 of a lever 222, also rigidly mounted on the printer shaft 87, so that the bail 213, 216, 206, is prevented from swinging downwardly round the screws 212 and 205. With the arm 223 of the lever 222, and with the arm 224 of the lever 219, engage springs 225, one spring with each arm, which springs are connected at their free ends in any suitable manner in the machine housing, and these springs act upon the levers 222 and 219, and consequently upon the bail 213, 216, 206 in the clockwise direction. The swinging movement in the clockwise direction, however, is normally prevented by the draw-bar 196, the nose 197 of which engages over the nose 198 of the lever 199. The bar 216 of the bail 213, 216, 206, in a manner to be described later, is capable of co-acting with the noses 35g formed on the downwardly and forwardly extending number key levers 35 (Figure 3). Moreover the noses 35g are arranged on forward extensions 35h of different lengths on the number key levers 35, the lengths of these extensions corresponding to their values "0" to "9," the extension 35h corresponding to the value "0" (Figure 3) being the shortest and the extension corresponding to the value "9" being the longest.

The numeral wheel trains of each column totalizer T as the totalizers T are brought to the adding zone, are releasably locked against rotation and also aligned for correct mesh with the master wheel by a locking and aligning tooth 253. The locking and aligning tooth 253 is, as is evident from Figure 7, of U-shape.

Figure 9:
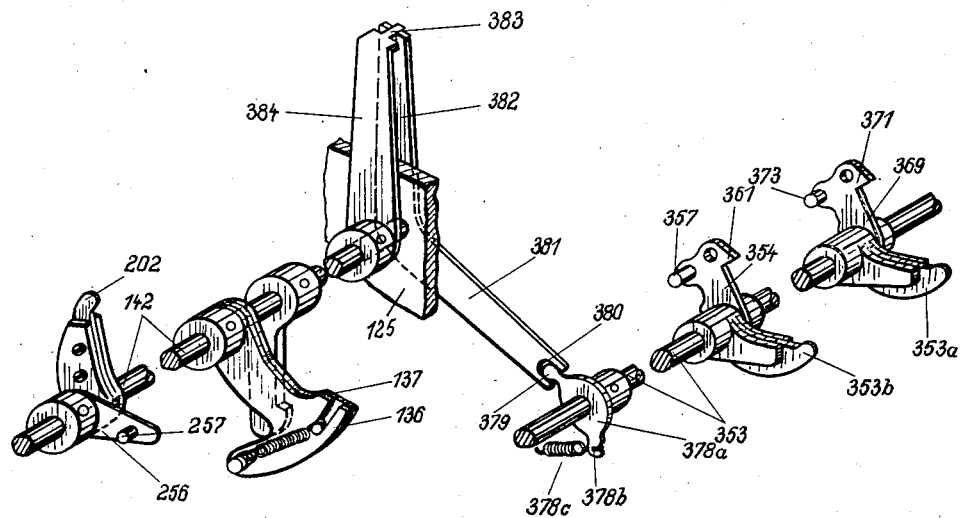
Figure 9 shows in perspective the locking mechanisms for the column and cross totalizers viewed from the front left-hand side of the machine.

An elongated hole 254 is provided in each of the limbs 252 and 253a, and through these holes projects the master wheel shaft 186 already described. Into the elongated hole 255, arranged in the limb 252 of the locking and aligning tooth 253, and correspondingly formed to that in Figure 9, there projects a pin 257 rigidly mounted on the lever 256 fast on the locking shaft 142, hereinbefore described.

A spring 258 engages with a lug 259 of the locking and aligning tooth 253 and is connected to the lever 256. The locking and aligning tooth 253 is positioned in its normal position with the lower end wall of its elongated hole 254, resting against the master wheel shaft 186 and the upper end wall of the elongated hole 255, against the pin 257 of the lever 256. On the bridge connecting the two limbs 252 and 253a of the locking and aligning tooth 253, a tooth-like projection 260 is formed, capable of engaging in the tooth spaces of the toothed wheels 188, arranged in the column totalizers.

Figure 10:
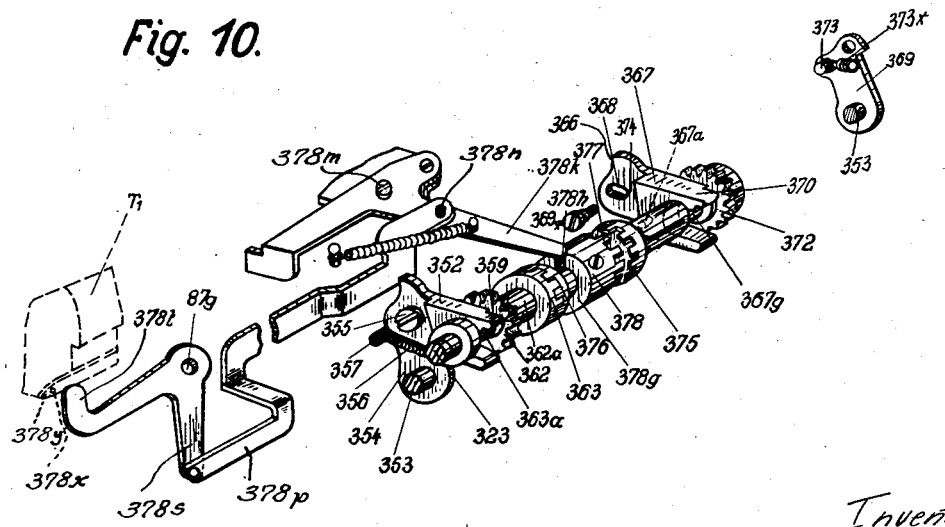
Figure 10 shows in perspective the control, known in itself, for the coupling arranged between the driving wheels of the cross totalizers, viewed from the front left-hand side of the machine.

A detent lever 354 (Figs. 9 and 10) is fast on a shaft 353 journaled in the right hand side wall 125 of the calculating mechanism housing and in a suitable bracket, not shown, mounted in the housing.

A locking and aligning pawl 352 is forked at its forward end to embrace the hub 363a of a cross footer master wheel 362 loosely mounted on the cross footer master wheel shaft 323.

The rear end of the locking and aligning pawl 352 is loosely attached at 355 to one side face of the upper end of the detent lever 354. A spring 356 connected at 357 to the upper end of the detent lever 354 and to the locking and aligning pawl 352, holds the two in their normal relative positions.

One of the tines of the forked forward end of the locking and aligning pawl 352 is formed into a chisel-like tooth 359 to engage between the teeth of the denominational trains of the cross totalizer Q1 as such trains are successively presented to the pawl.

A nose 361 on the detent lever 354 normally engages the master wheel 362 of cross totalizer Q1, the hub 363a of the master wheel having a coupling member 363 formed at that end opposite the master wheel 362.

A similar locking and aligning pawl 367 is forked at its forward end to embrace the hub 367g of a master wheel 372 journaled on the cross footer master wheel shaft 323. The rear end of the locking and aligning pawl 367 is loosely connected at 368, 369x to the side face of the upper end of a detent lever 369 fast on the rotatable shaft 353. Like the locking and aligning pawl 352, the duplicate pawl 367 has a tooth 371 formed on the upper tine 370 to engage with the toothed wheels of the denominational trains of gears of the cross totalizer Q2, not shown, and a spring 373x connected at 373 to the detent lever 369, and at 367a to the aligning pawl 367, maintains the detent and pawl in their normal relative positions. The tooth 371 of the detent lever 369 normally engages and locks the cross footer master wheel 372.

A coupling member 375 is formed at that end of the cross footer master wheel hub 367g opposite the cross footer master wheel 372. In both instances, the cross footer master wheels 362, 372, though rotatable on their supporting shaft 323, are not axially movable thereon, which is easily arranged by forming grooves in the respective hubs 362a, 367g to accommodate the forked ends of the locking and aligning pawls 352, 367, respectively.

A coupling sleeve 378 is interposed between the two coupling members 363, 375 on the cross footer master wheel shaft 323, the coupling sleeve being axially shiftable but non-rotatably mounted on the cross footer master wheel shaft and having coupling members 376 and 377 formed at its opposite ends to co-act with the coupling members 363 and 375, respectively.

The coupling sleeve 378 has three positions, in one of which it engages only the coupling member 363 of the cross footer master wheel 362 for cross footer Q1; in another of which, it engages only the coupling member 375 of the cross footer Q2, and in its intermediate position, the coupling ends 376 and 377 of the sleeve 378 engage both coupling members 363 and 375 of the respective cross footers Q1 and Q2 to effect the simultaneous operation thereof. The axially shiftable coupling sleeve 378 is shifted by a shift lever 378k, pivoted at 378m on a lug projecting from the rear wall 261 (Fig. 3) of the calculating mechanism, the shift lever carrying at its free end a pin 378h accommodated in a circumferential groove 378g formed on the sleeve 378.

A connecting rod 378p, one end of which is pivoted at 378m to the shift lever 378k intermediate the pivot 378m and the free end of the lever, connects the shift lever with one arm of a bell crank 378s pivoted at 87g, the free end 378t of the remaining arm of the bell crank 378s, projecting into the path of cams 378y mounted at 378x on the respective column totalizers T.

Motion is transmitted from the locking shaft 142 to the cross footer locking shaft 353 as follows: The rearwardly projecting end 379 of a lever 378a fast on the shaft 353 is articulated as at 380 with the forwardly projecting arm of a bell crank 381 journaled on the shaft 142 adjacent the right hand side wall of the calculating mechanism. The vertically extending arm 382 of the bell crank 381, 382 is recessed as at 383 to accommodate a lateral tenon 383 projecting from an arm 384 parallel with the arm 382 of the bell crank, but fast on the locking shaft 142 on the opposite side of the side wall 125.

A spring 378c connected to the opposite arm of the articulated lever 378a and to the cross footer locking shaft 353 tends to rock the shaft 353 clockwise to yieldingly hold the totalizer wheel detents 354 and 369 engaged with their respective cross footer totalizer master wheels 362 and 372.

On a cross rod 456 (Figure 11) rigidly mounted in the two side walls 454 and 455 of a totalizer, a locking lever 457 is swingably mounted in the lowest decimal place, and is formed with its lower end of fork-shape. The release lever 202 (Figure 7), hereinbefore described, is capable of engaging in the fork-shaped part 458, to rock the lever counterclockwise. With the locking lever 457 there engages a spring 459, which is connected to a rod 460 mounted in the two side walls 454 and 455 of the column totalizer T. The spring 459 acts on the locking lever in the clockwise direction round the cross rod 456, whereby its normal position is determined by the engagement of the tooth 461 of the locking lever 457 with the 30-toothed wheel 188Ht rotatably mounted on the bearing shaft 462.

With the toothed wheel 188Ht (Fig. 11) of the lowest decimal place, a disc 465 provided with three tens-shift or transfer teeth 464, and a peripherally recessed disc 466, are rigidly connected. The three parts 188Ht, 465 and 466, are produced from a single piece and consequently represent a single element. The nose 467 provided on the upwardly-directed free end of the locking lever 457 is capable of acting on a locking flap 468 rockably mounted in the two side walls 454 and 455.

To the right of the locking lever 457 (as seen in Figure 11) there is a transfer lever 469 swingably mounted on the cross rod 456. The downwardly directed arm 470 of the transfer lever 469 is of fork-shape, and is capable of co-acting likewise with the release finger 202 above mentioned. The nose 471 of the transfer lever 469 co-acts likewise with the locking flap 468. On the transfer lever 469 a transfer wheel is rotatably mounted by means of a headed rivet 472 (Fig. 11), the transfer wheel consisting of a ten-toothed wheel 473, a ten-toothed Maltese wheel 474 and a ten-toothed wheel 475, produced from a single piece, of which the toothed wheel 473 is capable of co-acting with the three-toothed tens-shift disc 465, and the Maltese wheel 474, with the peripherally recessed locking disc 466 which is provided with three notches 476 for the free passage of the teeth of the Maltese wheel.

The toothed wheel 188Ht is, further, in engagement with an intermediate gear 477 (Figs. 2 and 11), which is loosely rotatable on a shaft 478, rigidly mounted in the two side walls 454 and 455 of the column totalizer T. The intermediate gear 477 is in engagement with the toothed wheel 480 (Fig. 2), loosely rotatable on the numeral wheel shaft 479, rigidly mounted in the two side walls 454 and 455 of the column totalizer. A numeral wheel 481 is rigidly connected with the toothed wheel 480. The transfer wheel, 475, associated with the lowest decimal place of the hundredths decimal place, is in engagement with the wheel 188Zt of the tens decimal place. The parts above described for the hundredths decimal place are similar for the tenths, units, tens, etc., decimal places. In the following, therefore, only the difference will be pointed out.

By means of a second locking lever 482 (Fig. 11) swingably mounted on the cross rod 456, of which lever the nose 483 acts on the locking flap 468, the flap 468 is held swung in the anti-clockwise direction, whereby its rest position is determined by its contact with the noses 467 of the levers 457, 469 and by contact of the noses 461 three-armed lever 114 lying in its path of movement, and rocks the upper arm 114a of the lever 114, in the anti-clockwise direction back into the path of movement of the nose 80 of the pawl 74, into position to disengage the pawl 74 in a manner to be later described. By the return of the lever 114, the tension spring 115, is again tensioned and the latch bar 98, mounted on the levers 100 and 101 is returned by the arm 111 connected to the lever 114, and by the resulting swinging movement of the rock shaft 99, in the clockwise direction, whereby the nose 98x of the latch bar 98, moves behind the lug 103a of the stationary support 103, under the pull of the spring 109. In consequence of the shifting movement of the latch bar 98 in the clockwise direction, the nose 95d of the pawl 95 on the depressed key lever 82 falls behind the nose 97 of the latch bar 98 since, at this moment, the key lever 82 concerned is still depressed and is held by the key locking bar 110 which is held by the catch 120. Although the key locking bar 110 is held swung in its position in the anti-clockwise direction, the arms 100 and 101 and the latch bar 98, in consequence of the resilient connection of the springs 110b, are capable of swinging in the clockwise direction.

On the rotation of the three cams 69, 71, 72, the roller 133 on lever 132, 134, which, by means of the pull of the spring 141, is held in contact with the cam 69 (Figure 5) first follows at 10 degrees the depression of the same, whereby the draw-bar 134, jointed to the roller lever 132, is drawn in the direction of the arrow a. The part 137 pivotally connected with the draw-bar 134 (Figure 7) by the screw 135, is thereby moved downwards along with the draw-bar. The pin 143, fixed to the part 137, which passes through the slot 144 of the lever 136, takes the latter and the locking shaft 142 along with it in the clockwise direction. The angle lever 150, which is jointed to the lever 136 through an angle member 148, is likewise, through the movement of the draw-bar, swung round its pivot 151 in the anti-clockwise direction. Consequently the downwardly extending arm of the lever 150 displaces the toothed wheel 159, non-rotatably mounted on the shaft 158, in the arrow direction a2, by means of its grooved connection 155 and 156, whereby the teeth of the same engage with the teeth 177 of the calculating sector 174. The pins 160 (Figure 3) arranged on the toothed wheel 159, which are continually guided in the grooves of the claw 161, rigidly mounted on the transmission shaft 158, ensure that the teeth of the toothed-wheel 159 slide securely into the teeth of the calculating sector 177 (Figure 7). As already mentioned, the locking shaft 142 is rotated in the clockwise direction by the lever 136, whereby the finger-shaped release lever 202 rigidly mounted on the locking shaft 142 is swung and the locking lever 457 or 469, partially illustrated in Figure 7, unlocks the corresponding decimal wheel of the totalizer T1 located in the working position.

Further, the adjusting and locking tooth 203, rigidly mounted on the shaft 142, releases the master wheel 189, and the master wheel shaft 186 connected with it, and the adjusting and locking tooth 179 likewise rigidly mounted on the locking shaft 142 releases the toothed wheel 178 and the transmission shaft 158 connected with it.

The locking lever 199 (Fig. 7), pinned to the locking shaft 142, swings in the clockwise direction and releases the nose 197 of the lever 196 jointed to the lever 194, by means of a screw 195.

After these movements have taken place, the differential control cam 72, which has rotated to bring its lower curved part in the vicinity of the roller 168 on lever 167 to enable the lever 167 at 30 degrees following the pull (Figure 7) of the spring 171, is swung round its shaft 87 and accordingly the slide 170 (Figure 5) is drawn in the direction of the arrow a. By the downward movement of the slide 170, the cam slot 173x (Figure 7) acts on the roller 175 (Figs. 3, 7) arranged on the calculating sector 174, 177 and projecting through the slot 173, and swings the sector 174, 177 in the direction of the arrow p. Since the latter is rigidly connected to the differential shaft 128 by means of the clamping device 176, this shaft participates in the rotational movement in the direction of the arrow p. The feeler fingers 129, rigidly mounted on the differential shaft 128 and designed for the values "0" to "9," are thereby swung together in the anti-clockwise direction until the feeler finger 129 corresponding to the value "2" strikes the pin 131 of the stop-piece 85, which has been swung upwards by depression of the calculating key 34, corresponding to the value "2." The stroke of the feeler finger 129 is transmitted to the calculating sector 174, 177, and accordingly the toothed wheel 159 (Figure 7) which is in engagement with the sector is rotated through two units, whereby the value is transmitted by the shaft 158, and the change-over gear 180 (Figure 7) 187, which was previously set for addition, through the knob 315 (Figure 1), and the master wheel shaft 186, to the master wheel 189, which on its part, enters the value "2" in the corresponding totalizer decimal wheel of the column totalizer T1.

By the contact of the feeler finger 129, corresponding to the value "2," with the stop member 131, the slide 170, together with the roller 168 on lever 167, was prevented from further downward movement and since the formation of the cam 72 (Figure 5) is adapted for the greatest stroke, namely, for the stroke of the feeler finger 129, corresponding to the value "9," the roller 168 on lever 167 remains for a short time freely suspended, and on the further rotation of the cam 72 is engaged and restored to normal position. Before, however, the return of the roller 168 on the lever 167 and the slide 170 connected with it occurs, the arms 204 and 211 (Figures 3 and 7) rigidly mounted on the ends of the differential shaft 128, participate in the swinging movement of the feeler fingers 129 (or of the calculating sector 174, 177) and of the shaft 128. Accordingly the type selecting frame 213, 216 and 206, jointed at the points 212 and 205 and guided on the slide bars 219, 222 by screws 220 and 217, will slide forwards through an amount corresponding to the value "2." The lower edge 216a of the ball 216 thereby is positioned over the nose 35g (Figure 3) of the number key lever 35, corresponding to the value "2."

Shortly, thereafter, the roller 166 mounted on the lever 165 rigidly connected with the printer shaft 87 (Figures 5, 7) falls into the depression of the cam 71 at 130 degrees whereupon the arms 219 and 222, rigidly connected to the shaft 87, are swung in the clockwise direction by the springs 225 engaging with their short arms 223 and 224, and with them also the selecting frame 213, 216, 206 guided by them. This frame thereby strikes on the nose 35g of the number typing key lever 35, corresponding to the value "2" and presses this lever downwards against the action of its of the locking lever 457, in the tooth spaces of the toothed wheels 188. The lever 482, moreover, is held swung in the clockwise direction by means of a spring (not illustrated) which engages with the hole 485 of the lever 482.

As no calculating operation should be permitted in the totalizer when any of its decimal positions is in register with the master wheel, the locking shaft 142 (Fig. 7) and the parts located on it are prevented from being unlocked by the release finger 202, which when the punctuation place of the column totalizer is opposite the master wheel 189, co-acts with the stop SS (Fig. 11) swingably mounted on the cross rod 456 of the column totalizer T in such a manner that the projection 487 of the stop SS contacts the anchor rod 460 fixed in the side walls 454, 455 of the totalizer T. Consequently the release finger 202 is prevented from swinging in clockwise direction.

The method of operation of the invention will now be explained by the aid of an example of a calculation.

After the form is inserted, the name "O. Schmidt" (Figure 12) is typed in the column indicated at "1" by striking the letter keys 32 (Figures 1 and 2) whereby the paper carriage 4 is traversed stepwise to the left and the column of the sheet indicated by "2" has moved into the typing position. In the column "2," the number "15" is now entered by striking the corresponding number typing keys 33 (Figures 1 and 2).

After the number "15" has been typed and by utilizing the space key S (Figures 1 and 2) the paper carriage 4 has been brought into a position in which the column indicated by "3" is in the typing position. By means of the letter keys 32, the "months" column "3" is now filled in, whereby the paper carriage 4 is brought so that the column of the sheet indicated by "4" is in the typing position.

As already stated, the paper carriage 4 is located so that the column "4" of the sheet is in the typing field whereby the totalizer T1 is also in the working position. Moreover, the carriage s2 carrying both of the cross totalizers Q1 and Q2 has been drawn so far to the left, by the column totalizer T4 and the coupling device s, s1 (Fig. 1) that the corresponding decimal wheels of the cross totalizers lie opposite their master wheels 362 and 372, Fig. 10. When the column totalizer T1 arrived in its working position, the bar 87t (Figure 8) fixed to the same depressed the nose 87s' of the lever 87s, whereby the nose 87s" of the lever 87s released the lever 87u, and the remaining parts operable by the lever 87s assumed positions according to Figure 8, so that the locking lever 87a of the printer shaft 87 and the hook 98" of the latch bar 98, were released by the lever 87d, and can move freely. Now the calculating keys 34, corresponding to the amount of "RM200" are depressed after one another, the key corresponding to the value "2" being struck first. On the depression of the calculating key lever corresponding to the value "2," the rearwardly-directed arm on the calculating key lever 82 (Figures 5 and 7) is swung round the fulcrum rod 68 in the clockwise direction, whereby the associated U-shaped stop member 85, the downwardly directed limb 84 of which contacts with a face 82a of the calculating key lever 82, is swung in the anti-clockwise direction round its printer shaft 87. The contact pin 131, provided on the stop member 85, thereby moves into the path of movement of the arm 130 of the feeler finger 129, corresponding to the value "2." Continued depression of the already mentioned calculating key 34 causes the pawl 95 (Figures 2, 5 and 7) arranged on the key lever 82, contacting the right-angled upwardly bent nose 97 of the pivoted latch bar 98, to rock the latch bar clockwise against the action of the spring 109 to disengage the edge 98s of the lug 98x (Figure 5) of the latch bar 98, from the edge 103g of the laterally projecting lug or stop 103a, whereby the spring 115 is freed to rock the shaft 99 with its levers 100, 101 and 111 and the three-armed lever 114, mounted on the fulcrum rod 68, and in engagement with the lever 111, by the pin-slot connection.

On the swinging of the parts 100, 98 and 101 in the anti-clockwise direction, the appropriate nose 97 of the latch bar 98 slides underneath the nose 95d of the pawl 95. The key locking bar 110 swingably arranged on the shaft 99, the ends of which key locking bar, because of the tension of the spring 110b, normally lies against pins 100b and 101b, respectively, and participates in the counter-clockwise movement upon the release of the latch bar 98 from the stop 103a. By the movement of the key locking bar 110, the flange 110g, slides over a nose 82h (Figure 5) of the depressed key lever 82, and locks the same in the depressed position. Further, a projecting lug 120c, fixed to the locking bar 110, participates in the swinging movement and slides along on the under edge of a lock-retaining catch 120 (Figure 5) swingably mounted on the fulcrum rod 68. The pull of the spring 123, attached to the catch 120, fits the recess 120d in the catch over the upper end of the lug 120c until the cams 69, near the end of a machine cycle, rock the catch 120 to release the lug 120c, as well as the key locking bar 110, in a manner to be later described. A depressed calculating key lever, therefore, is not released until the corresponding value has been transferred. Also simultaneous depression of two calculating keys 34, cannot take place owing to a well known roller lock. As already explained, on striking the calculating key 82, corresponding to the value "2," the system of levers 100, 101 and 111, attached to the rock shaft 99, as well as the three-armed lever 114, swingably mounted on the fulcrum rod 68, have been released, whereby the latter lever, under the pull of its spring 115, has been swung in the direction of the arrow m (Figures 5, 2). The nose 114x of the upwardly directed arm 114a, of the lever 114, moves out of the path of the nose 80, of the pawl 74. The downwardly-directed arm 114b, on the other hand, has moved into the path of movement of the high point of the cam 72. Since the pawl 74 is displaceable in relation to the cam 72, by means of the pin-slot connection 75, 76, 77, 78 and the compression spring 79, and was arrested by the nose 114x of the lever 114, the pawl 74 will follow in the arrow direction c under the pressure of the spring 79, on swinging out of the lever nose 114x, whereby the tooth 74a of the pawl 74, moves into engagement with the toothed wheel 73, rotated by the parts 58 (Figure 1) 59, 56, 57 and 28 to 30, whereby all three cams 69, 71 and 72, are coupled with the toothed wheel 73 so that they participate in the rotational movement of the toothed wheel in the arrow direction b (Figures 2, 5).

In the rotation of the three cams, after the nose 80 of the pawl 74, has just moved past the nose 114a of the three-armed lever 114, the cam 72 first acts at 60 degrees on the arm 114b of the spring 38 (Figure 2). The control tooth 49c of the drawhook 49 is moved by the coupling lever 41 into engagement with the fluted shaft C. This now draws the draw-hook 49 forwardly and through the intermediate lever 47, causes the type lever 54 bearing the type 2 to strike on the platen 5. During the striking movement the control tooth 49c moves out of engagement with the fluted shaft C. Through the striking movement of the type lever, the paper carriage has been moved by the escapement 54a to 54e one step to the left under the pull of the carriage draw-spring so that the next lower denominational wheel of the column totalizer T1 now lies opposite to the master wheel 189 (Figure 7).

After the termination of the calculating operation and before the commencement of the paper carriage shift (in which the time for registration of the value "10" is to be taken into consideration) the raising of the roller 133 on lever 132, loosely mounted upon the shaft 87, is effected at 145 degrees by the elevated part of the cam 69, which is indicated by 69c. The slide 134 (Fig. 7) is thereby raised in the opposite direction of the arrow a to restore the lever 137, in the anti-clockwise direction and by means of the flexible connection 143, 145 and 146, the lever 136 is also swung in the anti-clockwise direction. In consequence of this swinging movement of the lever 136, the locking shaft 142 is swung in the anti-clockwise direction, and the axially shiftable wheel 159 is disengaged from the calculating segment 174 by means of the parts 148 and 150 (Figures 7 and 3). By the rocking movement of the locking shaft 142 in the anti-clockwise direction, the releasing finger 202 (Figure 7) has restored the locking lever (in Figure 7 illustrated broken off), lying opposite to it, so that the calculating wheel of the totalizer T1, in which the value "2" was registered is again locked. By the rocking movement of the locking shaft 142, in the anti-clockwise direction, the lever 199 (Figure 7) has also been reengaged with and has swung the lever 196 against the action of its spring 200.

As soon as these locking operations are completed, the carriage shift operation effected by the typing operation as above described, follows.

After the locking operation is effected, the roller 166 on the lever 165, rigidly mounted on the printer shaft 87, is raised at 225 degrees by the rising edge 71a (Figure 5) of the cam 71 to rock the shaft 87 counter-clockwise. Accordingly, the arms 222 and 219, fixed on the printer shaft 87, are also swung in the anti-clockwise direction, whereby the key selecting frame 213, 216, 206 mounted in them, is raised into its upper position. In consequence of this, the nose 35g (Figure 3) of the number key lever 35, corresponding to the value "2" is released. This now returns into its rest position under the action of its spring 38 (Figure 2), whereby the coupling lever 41, mounted on the key lever again engages over the nose 45 of its co-operating draw lever 49.

In the rocking movement of the printer shaft 87 (Fig. 7) in the anti-clockwise direction, the arm 194 has also raised the lever 196, whereby under the action of the spring 200, the nose 197 of this lever snaps over the nose 198 of the lever 199 already located in its rest position.

After the raising of the key selecting frame 213, 216, 206, the cam 72, after 240 degrees of travel, brings its rising face 72b (Figure 5) into operation on the roller 168, mounted on lever 167, loosely mounted on the printer shaft 87, to restore the lever into its rest position. The slide 170 was thereby raised against the action of its spring 171, whereby the inclined slot 173x of the slide acts on the roller 175 of the calculating sector 174, which has meanwhile been released from the wheel 159, and swings this sector in the opposite direction to the arrow p. In consequence of this, the transmission shaft 128 rigidly connected to it is returned, together with the feeler fingers 129 into their rest positions. Also the number key selecting frame 213, 216, 206 is returned to its rest position illustrated in Fig. 7, by the arms 204 and 211 jointed to it and rigidly mounted on the differential shaft 128, in which position the frame is held by the elevated part of the cam 71 (Figure 5).

Further, before the return movement of the number key selecting frame 213, 216, 206 to its rest position illustrated in Figure 7, the rising edge 69c (Figure 5) of the cam 69 operates at about 162 degrees on the end 120a of the catch 120, whereby this catch is swung against the action of its spring 123. Consequently the nose 120b of the catch 120 releases the part 120c of the key locking bar 110, whereby this bar under the action of its spring 110b (Figure 6) tensioned by the previous return of the latch bar 98 into its rest position, likewise moves back into its rest position. Accordingly, the nose 82h (Figure 5) of the calculating key lever 82 corresponding to the value "2" is released, which lever under the action of the spring 89 engaging with its associated stop member 85 (Figure 7) now returns along with the stop member 85 into the rest position illustrated in Figure 7, with the pawl 95 mounted on the calculating key lever 82 above the edge 97 of the latch bar 98.

Finally, the nose 80 of the clutch pawl 74, mounted on the coupling disc 72 (Figure 5) collides with the nose 114x of the three-armed clutch-disabling lever 114, already located in its rest position, whereby the clutch pawl 74 is disengaged against the action of its spring 79 from the wheel 73 of the continually rotating drive shaft 58. In order to prevent the cam series 69, 71, 72 from springing back at the moment when the clutch pawl 74 is raised out of engagement with the toothed wheel 73, the roller 117 of the back lash preventing dog 116 snaps at 200 degrees into the depression 69d of the cam 69 under the action of its strong spring 119, whereby the cam series 69, 71, 72 is held in the position illustrated in Figure 5.

It would be too exhaustive to repeat the process already described for the registration of the value "2," for the values to be registered in the totalizers T2 to T6 since the operations are exactly the same.

The following may be mentioned at this point briefly in addition.

The paper carriage or the totalizer T1 is now located with the decimal wheel following that on which the value "2" is registered in the column "4," in the working position, in which a "0" is to be registered, i. e. in this case, therefore, no calculating operation is to take place, while the typing process must be released.

To this end, the feeler finger 129, corresponding to the zero calculating key 82 (Figure 7) is fixed to the clamping jaw 129d of the arm 204. On striking the zero calculating key 234, the same operations occur exactly as above described, only with the difference that in consequence of the immediate contact of the finger 129, corresponding to the value "0," with its stop screw 131, no swinging of the calculating segment results. However the bar 216 is moved downwards and strikes the nose 35g of the number typing key corresponding to the value "0" and the associated type lever is caused to strike. Incidentally, a carriage step is again effected so that now the units of dollars decimal wheel of the totalizer T1 (the wheel lying to the left of the punctuation place) is located in the working position.

Here, the same operations occur since a "0" is to be dealt with, whereby the totalizer T1 moves so that its punctuation place is in the working position.

If, here, unintentionally a calculating key is struck, the coupling 69, 71, 72, 74, would naturally make a revolution and the key selecting bar 216 would be moved downwards by the springs 225 under control of the cam 71 and the roller 165, 166, by way of the parts 87, 222, 219, and the number typing key corresponding to the value of the depressed key would be depressed, whereby the value printed would obviously be incorrect. In order to prevent this, the locking arrangement 197, 196, 194 is provided which does not permit swinging of the printer shaft 87, and with it a downward movement of the key selecting bar 216.

This locking action is obtained by arranging a fixed locking member SS (Figure 11) in the punctuation position. Accordingly, the locking member SS prevents the release finger 202 (Figure 7), lying opposite to it from rocking in the clockwise direction, and hence, the lock shaft 142 and the lever 199 remain substantially in their rest positions. As a result the lever 196 is not released, and as the lever 136 cannot rock because the lock shaft 142 is held stationary the parts 148 and 150 connected to it remain at rest. The axially slidable wheel 159, therefore, is not shifted into engagement with the calculating segment 174. This segment, however, can swing idly back and forth under the action of the spring 170, and the operating slide 170, and idly advance and retract the key-selecting bar 216. This, however, in consequence of the above-mentioned effective position of the locking device 199, 196 will not cause a numeral type actuation.

Nevertheless, if it is desired, a comma could be printed under these circumstances in the punctuation place. For this, it is only necessary that the slots 218 (Figure 7) and 221 in the arm 219 and 222 be formed of such length that the calculating segment 174 can swing through ten units so as to position the key-selecting bar 216 on a projection 35g (Figure 3) of the comma typing key. But, in order to initiate a printing operation, the locking device 199, (Figure 7) above described, must be abandoned, since this device would prevent a rocking movement of the printer shaft 87, and therewith a downward movement of the key-selecting bar 216. In spite of the swinging movement of the segment 174, however, no transmission of values takes place to the calculating mechanism, since, as mentioned, the wheel 159 is not in engagement with the calculating segment 174. In the present case, the typing of the comma is discarded and hence the lock, 196, 199 is retained.

In order to pass from the punctuation position into the next lower decimal place, the space key S (Figures 1 and 2) is struck, so that the totalizer T1 is now located with its tenths decimal wheel in the working position.

If the numerical example given in Figure 12 is now considered, it should be clear without further explanation that for the further columns, including the column 9, the same procedure is followed only with the difference that in the columns 5 to 7, inclusive, the cross totalizer Q1 is changed over to subtraction under control of the cams 301 (Fig. 1) on corresponding column totalizers T2 to T4, by means not shown, while the sleeve 378 (Figure 10) remains in its left-hand position in which the cross totalizer Q2 is uncoupled.

In the columns 8 and 9, the sleeve 378 is brought into its middle position under control of the cams 378y (Fig. 11), on the totalizers T5 and T6, and positioned for addition so that the values shown in the columns 8 and 9, are added in both of the cross totalizers Q1 and Q2.

The amount "184,30" is then visible in the cross totalizer Q1 and the amount "4,30" in the cross totalizer Q2.

I claim:

1. In a power-driven typewriting-accounting machine, the combination with a totalizer, the wheels of which are arranged in spaced groups; shiftable means individual to the respective totalizer wheels to normally lock the wheels against rotation; a rotatable locking shaft; a release means connected to the shaft to shift the individual totalizer wheel locks successively, to idle position, upon rotation of the shaft; a stop member associated with the decimal space between the groups of wheels, to prevent operation of the totalizer wheel lock-release means and its locking shaft when the stop member is brought into the path of the totalizer wheel lock-release means; calculating keys; and means, including a rotatable print-initiating shaft, to record the digits of an amount successively, consequent upon the depression of the corresponding calculating keys; of means controlled by the locking shaft to normally lock the print-initiating shaft against rotation to prevent the operation of the digit recording means when the totalizer wheel lock-release means contacts the decimal space stop.

2. In a power driven typewriting-accounting machine, the combination with a totalizer, the wheels of which are arranged in spaced groups; shiftable means individual to the respective totalizer wheels to normally lock the wheels against rotation; a rotatable locking shaft; a release means connected to the shaft to shift the individual totalizer wheel locks successively, to idle position, upon rotation of the shaft; a stop member associated with the space between the groups of wheels, to prevent operation of the totalizer wheel lock-release means and its locking shaft when the stop member is brought into the path of the totalizer wheel lock-release means; calculating keys; and means, including a rotatable print-initiating shaft, to record the digits of an amount successively, consequent upon the depression of the corresponding calculating keys; of a gripping element mounted to rock with the locking shaft; a complementary gripping element connected with the rotatable print-initiating shaft; and means to yieldingly maintain the gripping elements inter-engaged to lock the print-initiating shaft against rotation and thus prevent the operation of the digit-recording means when the totalizer wheel lock-release means is arrested against operation.

3. In a typewriting-accounting machine having a power-driven means, the combination with a totalizer, the wheels of which are arranged in spaced groups; shiftable means individual to the respective totalizer wheels to normally lock the wheels against rotation; a rotatable locking shaft; spring-operated means under control of the power-driven means, to rock the locking shaft; a releasing means connected to rock with the locking shaft to successively shift the individual totalizer wheel locks to idle position; a stop member associated with the space between the groups of totalizer wheels to prevent operation of the totalizer wheel lock-releasing means and its locking shaft when the stop member is brought into the path of the totalizer wheel lock-release means; calculating keys; and means, including a print-initiating shaft rotatable from and to its home position, to record successively the digits of an amount consequent upon the depression of the calculating keys; of a gripping element connected with the rotatable print-initiating shaft, a complementary gripping element mounted to rock with the locking shaft and normally releasably engaging the first-named gripping element to lock the print-initiating shaft against rotation, the locking shaft, when rocked from its normal position operating to rock its gripping element out of engagement with the co-acting gripping element; and means to insure the re-engagement of the gripping elements upon the return of the print-initiating shaft and the locking shaft to their home positions.

HUGO ERNST KÄMMEL.